(No Model.)

L. LADD.
MACHINE FOR SEPARATING SEED FROM PULP.

No. 408,243. Patented Aug. 6, 1889.

Witnesses
Jos. S. Latimer
Francis H. Andrews

Inventor
Lafayette Ladd
by Arthur V. Browne
his Attorney

UNITED STATES PATENT OFFICE.

LAFAYETTE LADD, OF ADRIAN, MICHIGAN.

MACHINE FOR SEPARATING SEED FROM PULP.

SPECIFICATION forming part of Letters Patent No. 408,243, dated August 6, 1889.

Application filed February 20, 1889. Serial No. 300,573. (No model.)

*To all whom it may concern:*

Be it known that I, LAFAYETTE LADD, of Adrian, in the county of Lenawee and State of Michigan, have invented a new and useful Improvement in Machines for Preparing Seed-Pulp to Facilitate the Separation of the Seed Therefrom, of which the following is a specification.

The present invention relates to machines for facilitating the separation of the seeds of vegetables—such as squashes, cucumbers, melons, and the like—from the pulp in which they are contained.

The improved machine is illustrated in the accompanying drawings, in which—

Figure 1:
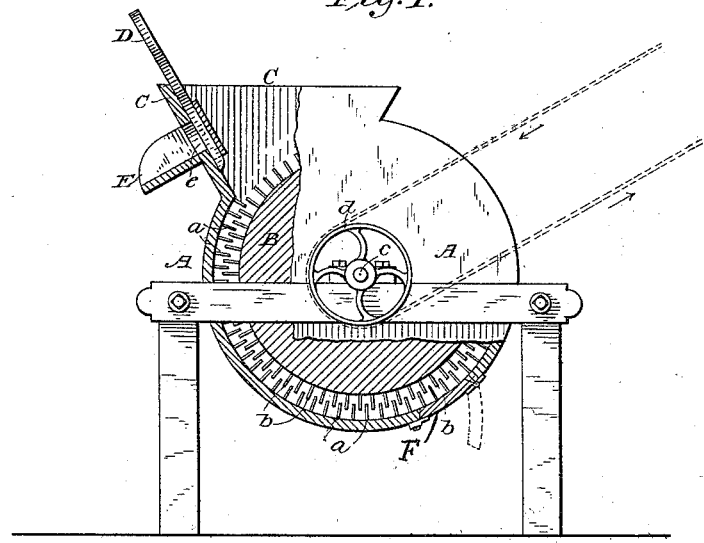
Figure 2:
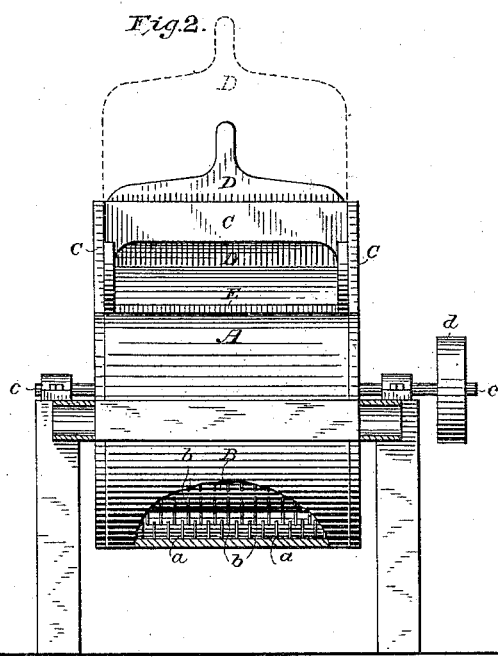

Figure 1 is a side view of the machine, partly in central vertical longitudinal section; and Fig. 2 is a front view of the machine, partly in section.

The machine consists, primarily, of a water-tight concaved tank or casing A and a rotating drum B, mounted therein. The tank or casing is mounted on a suitable framework, and is generally cylindrical in shape, conforming to the shape of the inclosed rotating drum. The cylindrical portion of the tank or casing is provided with projecting agitating-teeth $a\ a$, and the periphery of the drum B is also armed with similar agitating-teeth $b\ b$, intermeshing with the teeth $a\ a$. The shaft $c$ of the drum extends through one side of the tank or casing, and carries a band-pulley $d$, which may be rotated from any suitable source of power. The drum might be rotated by a hand-crank, if desired. The drum is rotated in the direction indicated by the arrows in the drawings, the upper portion of the drum moving toward the front or discharge of the machine.

On its front upper part the tank or casing is provided with an open-mouthed flaring hopper C, which serves both as a feed and discharge hopper. The front side of the hopper is provided with a discharge-port $e$, extending entirely across the machine, which is opened and closed by a sliding valve or gate D. A discharge-spout E leads from the discharge-port $e$.

In operating the machine the tank or casing is filled with a sufficient amount of the vegetable pulp containing the seed, the valve or gate D being first closed. The drum is then set in motion in the direction indicated, and the pulp is thereby carried between the drum and concave casing, and is thus acted upon by the teeth $a\ b$. The mixed pulp and seed are thrown by centrifugal force against the front wall of the hopper, and, falling back, are repeatedly carried between the drum and concave casing. In this manner the pulp is reduced to a fine comminuted state and is detached from and ceases to adhere to the seed. When the separation is completed, the gate is opened, and the drum is then rotated, so that the pulp and seed are thrown out by centrifugal force. The pulp and seed can then be entirely and easily separated by washing in a sieve.

The tank or casing has a valve or gate F in its bottom for discharging water used in cleaning.

I claim as my invention—

A water-tight concave casing having projecting teeth and a rotating cylinder within said casing having projecting teeth, in combination with a hopper on the upper front part of said casing, said hopper having a port in its front side, and a sliding valve or gate closing said port, substantially as set forth.

In witness whereof I have hereunto signed my name in the presence of two subscribing witnesses.

LAFAYETTE LADD.

Witnesses:
R. A. WATTS,
HENRY C. SMITH.